US008586698B2

(12) United States Patent
Kawata et al.

(10) Patent No.: US 8,586,698 B2
(45) Date of Patent: Nov. 19, 2013

(54) MANUFACTURING METHOD FOR PHENOLIC NOVOLAC RESIN AND RESIN-COATED SAND

(75) Inventors: Hiroyuki Kawata, Ibaraki (JP); Sadao Takashou, Ibaraki (JP); Tetsurou Saikawa, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 299 days.

(21) Appl. No.: 12/997,346

(22) PCT Filed: Jun. 3, 2009

(86) PCT No.: PCT/JP2009/060183
§ 371 (c)(1),
(2), (4) Date: Dec. 10, 2010

(87) PCT Pub. No.: WO2009/150983
PCT Pub. Date: Dec. 17, 2009

(65) Prior Publication Data
US 2011/0086974 A1   Apr. 14, 2011

(30) Foreign Application Priority Data

Jun. 12, 2008 (JP) .................................. 2008-154103
Dec. 25, 2008 (JP) .................................. 2008-330730

(51) Int. Cl.
*C08G 61/02* (2006.01)

(52) U.S. Cl.
USPC ............. 528/86; 528/127; 528/139; 528/140; 528/141; 528/142; 528/144; 528/165; 524/594

(58) Field of Classification Search
USPC ........... 528/86, 127, 139, 140, 141, 142, 144, 528/165; 524/594
See application file for complete search history.

(56) References Cited

U.S. PATENT DOCUMENTS

| | | | | |
|---|---|---|---|---|
| 3,476,707 A | * | 11/1969 | Buchanan et al. | 528/139 |
| 5,021,539 A | | 6/1991 | Armbruster et al. | |
| 5,073,622 A | | 12/1991 | Wojtech et al. | |
| 5,708,121 A | * | 1/1998 | Parks et al. | 528/163 |

FOREIGN PATENT DOCUMENTS

| | | |
|---|---|---|
| JP | 58-109524 | 6/1983 |
| JP | 2-261815 | 10/1990 |
| JP | 05-023787 | 2/1993 |
| JP | 2000-281739 | 10/2000 |
| JP | 2003-136184 | 5/2003 |

OTHER PUBLICATIONS

International Search Report Forms PCT/ISA/210, 220 and 237, for International Application No. PCT/JP2009/060183.

* cited by examiner

*Primary Examiner* — Shane Fang
(74) *Attorney, Agent, or Firm* — Antonelli, Terry, Stout & Kraus, LLP.

(57) ABSTRACT

The present invention relates to a production process for a phenols novolac resin obtained by reacting phenols with formaldehydes, wherein they are reacted in the presence of a metal compound used as a catalyst for the reaction described above, and a chelating agent is further added in order to deactivate a catalytic action of the metal compound and a resin-coated sand prepared by using the above phenols novolac resin. It is possible to provide a process for producing a phenols novolac resin having an ortho rate of 30 to 60%, suitably 40 to 55% at a good yield (70% or more) and a resin-coated sand having a high curing property prepared by using the above phenols novolac resin.

11 Claims, No Drawings

US 8,586,698 B2

MANUFACTURING METHOD FOR PHENOLIC NOVOLAC RESIN AND RESIN-COATED SAND

BACKGROUND OF THE INVENTION

The present invention relates to a production process for a phenols novolac resin and a resin-coated sand prepared by using the phenols novolac resin.

RELATED ART

Phenols novolac resins are used in a wide range of the fields such as molding materials, hardeners for epoxy resins, resins for photoresists, raw materials for epoxy resins and the like. It is known that a characteristic thereof, particularly a reactivity thereof is varied according to a rate of a methylene bond in an ortho position out of methylene bonds originating in aldehydes which are the raw materials therefor, that is, an ortho rate (refer to a non-patent document 1). It is known that, for example, if an ortho rate grows larger, a curing property exerted by amine compounds is accelerated, and it is known that also in the case of novolac epoxy resins obtained by epoxidizing phenols novolac resins, a curing property thereof is accelerated as well. Accordingly, novolac resins having various ortho rates are produced according to uses thereof.

It is known that, for example, if p-toluenesulfonic acid is used as a catalyst in reaction of phenol with formalin, novolac resins having an ortho rate of about 20% can be produced and that novolac resins having an ortho rate of about 40% can be produced by using oxalic acid. Further, it is known as well that novolac resins having an ortho rate exceeding 60% which are called high ortho novolacs can be produced by using zinc acetate. When phenols novolac resins having an ortho rate of about 40% are produced, methods for enhancing the reactivity such as carrying out reaction for a long time and elevating the temperature to carry out dehydration are tried since the catalyst used is a weaker acid as compared with a case in which novolac resins having an ortho rate of about 20% are produced (refer to a patent document 1).

Further, disclosed is a production process for phenols novolac resins in which phenols novolac resins having an ortho rate of 40 to 60% are obtained efficiently and industrially advantageously by carrying out reaction of phenols with aldehydes in the presence of an oxalic acid catalyst on the specific conditions of 110 to 160° C. and an applied pressure (refer to a patent document 2).

However, the problem that the yield is low, the problem that a large amount of phenols which are the raw materials is contained in waste water such as distilled water, separated water and the like and the industrial problem that an equipment for applying pressure is requires have been involved as well in the above methods for enhancing the reactivity.

Also, known is a method in which phenols novolac resins having a low ortho rate are mixed with phenols novolac resins having a high ortho rate to produce phenols novolac resins having a desired ortho rate. In the above method, however, it has been difficult to maintain evenly the quality.

In recent years, molds for castings are required to be shortened in production time per cycle of molding as rationalization of the production proceeds, and a faster curing property is strongly required to coated sands used therefor.

Patent documents:
Patent document 1: Japanese Patent Application Laid-Open No. 275121/1987
Patent document 2: Japanese Patent Application Laid-Open No. 179749/2002

Non-patent document:
Non-patent document 1: "Phenol Resins", p. 48 to 52, 1987, edited by Plastics Age Co., Ltd.

DISCLOSURE OF THE INVENTION

An object of the present invention is to provide a process for producing a phenols novolac resin having an ortho rate of 30 to 60%, suitably 40 to 55% at a good yield (70% or more) and a resin-coated sand provided with a high curing property by using the phenols novolac resin.

Researches repeated by the present inventors in order to solve the problems described above have resulted in finding that the targeted phenols novolac resin is obtained at a good yield by reacting phenols with aldehydes in the presence of a catalyst of a metal compound and then deactivating a catalytic action of the metal compound with a chelating agent and that a resin-coated sand prepared by using the phenols novolac resin described above is provided with a higher curing property.

That is, the present invention relates to the followings.
(1) A production process for a phenols novolac resin obtained by reacting phenols with formaldehydes, wherein they are reacted in the presence of a metal compound as a catalyst for the reaction described above, and a chelating agent is further added in order to deactivate a catalytic action of the metal compound.
(2) The production process for a phenols novolac resin according to the item (1) described above, wherein the phenols are at least one selected from phenol, cresol, xylenol, ethylphenol, phenylphenol, t-butylphenol, t-amylphenol, bisphenol A and resorcinol.
(3) The production process for a phenols novolac resin according to the item (1) or (2) described above, wherein the formaldehydes are at least one selected from formalin, paraformaldehyde and trioxane.
(4) The production process for a phenols novolac resin according to any of the items (1) to (3) described above, wherein the metal compound is at least one selected from oxides, organic salts, inorganic salts and hydroxides of monovalent to hexavalent metals.
(5) The production process for a phenols novolac resin according to any of the items (1) to (4) described above, wherein the chelating agent is at least one selected from ethylenediaminetetraacetic acid (ROTA), nitrilotriacetic acid (NTA), trans-1,2-cyclohexanediamine-N,N,N',N'-tetraacetic acid (CyDTA), diethylenetriamine-N,N,N',N'-pentaacetic acid (DTPA), ethylenediaminediacetic acid (EDDA), iminodiacetic acid (IDA), hydroxyethyliminodiacetic acid (HIDA), ethylenediaminedipropionic acid (EDDP), ethylenediaminetetrakismethylenephosphonic acid (EDTPO), hydroxyethylethylenediaminetetraacetic acid (EDTA-OH), diaminopropanoltetraacetic acid (DPTA-OH), nitrilotrismethylenephosphonic acid (NTPO), bis(aminophenyl)ethyleneglycoltetraacetic acid (BAPTA), nitrilotripropionic acid (NTP), dihydroxyethylglycine (DHEG) and glycoletherdiaminetetraacetic acid (GEDTA).
(6) A resin-coated sand comprising at least a fire-resistant aggregate and a phenols novolac resin, wherein the phenols novolac resin described above is the phenols novolac resin obtained by the production process for a phenols novolac resin according to any of the items (1) to (5) described above.

According to the present invention, the phenols novolac resin having an ortho rate of 30 to 60%, suitably 40 to 55% can be obtained at a good yield (70% or more), and a resin-coated sand prepared by using the above phenols novolac resin is provided with a high curing property.

BEST MODE FOR CARRYING OUT THE INVENTION

The production process for a phenols novolac resin according to the present invention shall be explained below in detail.

The production process for a phenols novolac resin according to the present invention is a production process for a phenols novolac resin obtained by reacting phenols with formaldehydes, and it is characterized by that they are reacted in the presence of a metal compound as a catalyst for the reaction described above and that a chelating agent is added in order to deactivate a catalytic action of the metal compound.

The phenols used in the present invention shall not specifically be restricted and include phenol, cresol, xylenol, ethylphenol, phenylphenol, t-butylphenol, t-amylphenol, bisphenol A and resorcinol. The phenols may be used alone or in combination of two or more kinds thereof.

The aldehydes used in the present invention include formalin, paraformaldehyde and trioxane. The aldehydes may be used alone or in combination of two or more kinds thereof. Among them, formalin and paraformaldehyde are preferred in terms of a handling property.

A use amount of the aldehydes is varied according to a molecular weight of the targeted phenols novolac resin, and they are used in an amount of usually 0.5 to 0.99 time mole per mole of the phenols. If it is less than 0.5 time mole, the yield is likely to be reduced, and if it exceeds 0.99 time mole, gelation is likely to be brought about.

The metal compound used as the catalyst is selected preferably from oxides, organic salts, inorganic salts and hydroxides of monovalent to hexavalent metals. The metal compound may be used alone or in combination of two or more kinds thereof, and it may be used in the form of a solid or a powder or in a state in which it is dispersed in an aqueous solution or a solvent. The metal compound includes, for example, zinc oxide, zinc salicylate, zinc acetate, manganese sulfate, titanium oxide, sodium chloride, vanadium pentaoxide, indium oxide, chromium oxide, cobalt oxide, nickel acetate, barium acetate, copper acetate, tin hydroxide, antimony hydroxide, lithium hydroxide, strontium hydroxide, lanthanum hydroxide, zinc chloride, zinc hydroxide, magnesium oxalate, calcium carbonate, magnesium hydroxide and the like.

A use amount of the metal compound is usually 0.0001 to 0.1 time mole, preferably 0.0002 to 0.05 time mole, more preferably 0.0003 to 0.01 time mole and particularly preferably 0.0004 to 0.005 time mole per mole of the phenols in terms of a metal ion. If it is less than 0.0001 time mole, the reactivity is likely to be notably reduced, and if it exceeds 0.1 time mole, the reaction is likely to proceed explosively.

The chelating agent used in order to deactivate a catalytic action of the metal compound includes ethylenediaminetetraacetic acid (EDTA), nitrilotriacetic acid (NTA), trans-1,2-cyclohexanediamine-N,N,N',N'-tetraacetic acid (CyDTA), diethylenetriamine-N,N,N',N'-pentaacetic acid (DTPA), ethylenediaminediacetic acid (EDDA), iminodiacetic acid (IDA), hydroxyethyliminodiacetic acid (HIDA), ethylenediaminedipropionic acid (EDDP), ethylenediaminetetrakismethylenephosphonic acid (EDTPO), hydroxyethylethylenediaminetetraacetic acid (EDTA-OH), diaminopropanoltetraacetic acid (DPTA-OH), nitrilotrismethylenephosphonic acid (NTPO), bis(aminophenyl)ethyleneglycoltetraacetic acid (BAPTA), nitrilotripropionic acid (NTP), dihydroxyethylglycine (DHEG) and glycoletherdiaminetetraacetic acid (GEDTA) and the like. The chelating agent may be used alone or in combination of two or more kinds thereof.

A use amount of the chelating agent is usually 0.01 to 100 times mole per mole of the metal compound. If the use amount is too large, an adverse effect is likely to be exerted on a strength of the synthesized product, and therefore it is preferably 0.01 to 20 times mole, more preferably 0.1 to 10 times mole and particularly preferably 0.4 to 6 times mole per mole of the metal compound.

In the present invention, the phenols, the aldehydes and the metal compound (catalyst) each described above are used and reacted usually at 100 to 160° C. and an atmospheric pressure. Also, the ortho rate can be controlled by changing timing of adding the chelating agent. That is, the ortho rate is lowered by adding the chelating agent in the beginning of the reaction and then further expediting the reaction, and it is raised by carrying out the reaction for a long time in the presence of the metal compound (catalyst) and then adding the chelating agent to further carry out the reaction. The ortho rate can be determined by infrared spectrometric analysis.

The phenols novolac resins having various ortho rates are produced according to uses thereof, and an ortho rate of the phenols novolac resins used for resin-coated sands, molding materials, resin materials for castings and the like is preferably 30 to 60%, more preferably 40 to 55%.

If the ortho rate is less than 30% when the phenols novolac resin is used to produce resin-coated sands, such defects that the resin-coated sands are delayed in curing are likely to be brought about, and if it exceeds 60%, such defects that the resin-coated sands are reduced notably in a strength are likely to be caused.

In order to obtain the phenols novolac resins having an ortho rate of 30 to 60%, preferably, the phenols, the aldehydes and the metal compound (catalyst) are reacted at 110 to 160° C. and an atmospheric pressure for 0.1 to 8 hours, and then the chelating agent is added. Further, after adding the chelating agent, they are reacted preferably at 80 to 160° C. for 1 to 5 hours. The temperature in adding the chelating agent shall not specifically be restricted and is preferably 110° C. or lower in order to prevent risk of bumping.

In order to obtain the phenols novolac resins having an ortho rate of 30 to 49%, preferably, the components are reacted at 110 to 160° C. and an atmospheric pressure for 0.1 to 4 hours, and then the chelating agent is added. Also, in order to obtain the phenols novolac resins having an ortho rate of 50 to 60%, preferably, the components are reacted at 100 to 160° C. and an atmospheric pressure for 1 to 8 hours, and then the chelating agent is added. In order to obtain the phenols novolac resins having an ortho rate of 40 to 55%, preferably, the components are reacted at 100 to 160° C. and an atmospheric pressure for 0.2 to 6 hours, and then the chelating agent is added.

The resin-coated sand of the present invention comprises at least a fire-resistant aggregate and a phenols novolac resin. The resin-coated sand of the present invention is characterized by using the phenols novolac resin obtained by the production process for a phenols novolac resin described above.

The resin-coated sand of the present invention can be produced, for example, in the following methods. A separable flask equipped with a thermometer, a condenser and a stirrer is charged with the phenols, the aldehydes and the metal compound to react them by heating. Then, the chelating agent is added continuously or discontinuously at prescribed temperature, and the temperature is maintained until the reaction is completed. Thereafter, the reaction solution is subjected, if necessary, to atmospheric dehydration and/or vacuum dehydration to obtain the phenols novolac resin described above. The resin-coated sand according to the present invention does not require specific production conditions and can be produced by a conventional production process using a kneading mixer, a speed mixer and the like. For example, the phenols novolac resin described above in which a particle diameter is controlled to 0.85 to 5.56 mm is added to a fire-resistant aggregate heated to 120 to 180° C. and mixed to coat the surfaces of sand particles (fire-resistant aggregate) with the molten resin. Then, a curing agent is added thereto and kneaded until the lumps of the sand particles (fire-resistant aggregate) are broken. Then, a lubricant is added thereto and mixed by stirring to thereby obtain the resin-coated sand of the present invention. The lubricant is added preferably to the resin-coated sand of the present invention according to necessity. Usually, the resin-coated sand is provided with a fluidity and an effect of enhancing a mold releasing property by adding the lubricant, and therefore it is preferred.

The fire-resistant aggregate used in the present invention shall not specifically be restricted as long as it is used for forming castings and includes quartz sand comprising quartz as a principal component, fluttery sand, alumina sand, zirconia sand, chromite sand, mullite sand, magnesia, fly ash and the like. In the present invention, the fire-resistant aggregate shall not specifically be restricted, and various fire-resistant aggregates such as the above new sands, recovered sands, reproduced sands and mixed sands thereof can be used. A particle size distribution and a particle size of the fire-resistant aggregate can be selected without providing any specific restrictions as long as it has a fire resistance endurable against casting and is suitable for forming castings.

The curing agent includes hexamethylenetetramine (hexamine), epoxy resins, isocyanates and the like. The lubricant includes calcium stearate, zinc stearate, calcium carbonate, talc, glass powder and the like.

In the resin-coated sand of the present invention, a blending amount of the phenols novolac resin is preferably 0.1 to 10 parts by mass, more preferably 1 to 3 parts by mass based on 100 parts by mass of the fire-resistant aggregate.

Also, a blending amount of the curing agent is preferably 1 to 30 parts by mass, more preferably 10 to 20 parts by mass based on 100 parts by mass of the phenols novolac resin.

Further, a blending amount of the lubricant is preferably 0 to 10 parts by mass, more preferably 0.001 to 5 parts by mass and particularly preferably 0.01 to 1 part by mass based on 100 parts by mass of the fire-resistant aggregate.

EXAMPLES

The present invention shall be explained below in detail with reference to examples, but the present invention shall not be restricted to the examples.
Production of Phenols Novolac Resins:

Example 1

A separable flask equipped with a thermometer, a Dimroth condenser and a stirrer was charged with 1000 g (molecular weight: 94.11 g/mol, 10.6 mole) of phenol, 200 g (6.13 mole) of paraformaldehyde (92 &), 230 g (2.84 mole) of formalin (37% and 2 g (molecular weight: 393.61 g/mol, 0.005 mole) of zinc salicylate trihydrate, and it was dipped in an oil bath set at 130° C. and heated. The temperature was maintained for one hour in a refluxing state and cooled down to 98° C., and then 4 g (molecular weight: 292 g/mol, 0.014 mole) of EDTA was added thereto at 98° C. After refluxing was started, the temperature was maintained as it was for 4 hours while Continuing refluxing. Next, the reaction solution was subjected in order to atmospheric distillation and vacuum distillation to obtain 998 g of a phenol resin (phenols novolac resin A). It had an ortho rate of 48% and a softening point of 96° C. A yield of the phenol resin (phenols novolac resin A) thus obtained was 78.3%.

Example 2

A separable flask equipped with a thermometer, a Dimroth condenser and a stirrer was charged with 1000 g (10.6 mole) of phenol, 200 g (6.13 mole) of paraformaldehyde (92%), 230 g (2.84 mole) of formalin (37%) and 2 g (molecular weight; 183.5 g/mol, 0.011 mole) of zinc acetate, and it was dipped in an oil bath set at 130° C. and heated. The temperature was maintained for one hour in a refluxing state and cooled down to 98° C., and then 4 g (0.014 mole) of EDTA was added thereto at 98° C. After refluxing was started, the temperature was maintained as it was for 4 hours while continuing refluxing. Next, the reaction solution was subjected in order to atmospheric distillation and vacuum distillation to obtain 904 g of a phenol resin (phenols novolac resin B). It had an ortho rate of 49% and a softening point of 94° C. A yield of the phenol resin (phenols novolac resin B) thus obtained was 70.8%.

Example 3

A separable flask equipped with a thermometer, a Dimroth condenser and a stirrer was charged with 1000 g (10.6 mole) of phenol, 200 g (6.13 mole) of paraformaldehyde (92%), 230 g (2.84 mole) of formalin (37 k) and 2 g (0.005 mole) of zinc salicylate trihydrate, and it was dipped in an oil bath set at 130° C. and heated. The temperature was maintained for 2 hours in a refluxing state and cooled down to 98° C., and then 4 g (0.014 mole) of EDTA was added thereto. The flask was heated again up to 104° C., and after refluxing was started, the temperature was maintained as it was for 4 hours while continuing refluxing. Next, the reaction solution was subjected in order to atmospheric distillation and vacuum distillation to obtain 994 g of a phenol resin (phenols novolac resin C). It had an ortho rate of 55% and a softening point of 91° C. A yield of the phenol resin (phenols novolac resin C) thus obtained was 78.0%.

Example 4

A separable flask equipped with a thermometer, a Dimroth condenser and a stirrer was charged with 1000 g (10.6 mole) of phenol, 200 g (6.13 mole) of paraformaldehyde (92%), 230 g (2.84 mole) of formalin (37%) and 2 g (molecular weight: 151.01 g/mol, 0.013 mole) of manganese sulfate, and it was dipped in an oil bath set at 130° C. and heated. The temperature was maintained for 0.5 hour in a refluxing state and cooled down to 98° C., and then 4 g (molecular weight: 191 g/mol, 0.021 mole) of NTA was added thereto. After refluxing was started, the temperature was maintained as it was for 4 hours while continuing refluxing. Next, the reaction solution was subjected in order to atmospheric distillation and vacuum distillation to obtain 960 g of a phenol resin (phenols novolac resin D). It had an ortho rate of 40% and a softening point of 98° C. A yield of the phenol resin (phenols novolac resin D) thus obtained was 75.3%.

Example 5

A separable flask equipped with a thermometer, a Dimroth condenser and a stirrer was charged with 1000 g (10.6 mole)

of phenol, 200 g (6.13 mole) of paraformaldehyde (92%), 230 g (2.84 mole) of formalin (37%) and 1.3 g (molecular weight: 100 g/mol, 0.013 mole) of calcium carbonate, and it was dipped in an oil bath set at 130° C. and heated. The temperature was maintained for 0.5 hour in a refluxing state and cooled down to 98° C., and then 8.3 g (molecular weight: 393 g/mol, 0.021 mole) of DTPA was added thereto. After refluxing was started, the temperature was maintained as it was for 4 hours while Continuing refluxing. Next, the reaction solution was subjected in order to atmospheric distillation and vacuum distillation to obtain 951 g of a phenol resin (phenols novolac resin E). It had an ortho rate of 44% and a softening point of 93° C. A yield of the phenol resin (phenols novolac resin E) thus obtained was 74.1%.

Example 6

A separable flask equipped with a thermometer, a Dimroth condenser and a stirrer was charged with 1000 g (10.6 mole) of phenol, 200 g (6.13 mole) of paraformaldehyde (92%), 230 g (2.84 mole) of formalin (37%) and 0.75 g (molecular weight: 58.3 g/mol, 0.013 mole) of magnesium hydroxide, and it was dipped in an oil bath set at 130° C. and heated. The temperature was maintained for 0.5 hour in a refluxing state and cooled down to 98° C., and then 5.1 g (molecular weight: 241 g/mol, 0.021 mole) of EDDP was added thereto. After refluxing was started, the temperature was maintained as it was for 4 hours while continuing refluxing. Next, the reaction solution was subjected in order to atmospheric distillation and vacuum distillation to obtain 934 g of a phenol resin (phenols novolac resin F). It had an ortho rate of 45% and a softening point of 95° C. A yield of the phenol resin (phenols novolac resin F) thus obtained was 72.7%.

Example 7

A separable flask equipped with a thermometer, a Dimroth condenser and a stirrer was charged with 1000 g (10.6 mole) of phenol, 200 g (6.13 mole) of paraformaldehyde (92%), 230 g (2.84 mole) of formalin (37%) and 2 g (molecular weight: 183.5 g/mol, 0.011 mole) of zinc acetate, and it was dipped in an oil bath set at 130° C. and heated. The temperature was maintained for 4 hours in a refluxing state, and then temperature in an inside of the flask was elevated up to 120° C. and maintained for 4 hours. The temperature was lowered down to 98° C., and then 4 g (0.014 mole) of EDTA was added thereto at 98° C. Temperature in an inside of the flask was elevated again up to 120° C. and maintained for 2 hours. Next, the reaction solution was subjected in order to atmospheric distillation and vacuum distillation to obtain 904 g of a phenol resin (phenols novolac resin G). It had an ortho rate of 59% and a softening point of 94° C. A yield of the phenol resin (phenols novolac resin G) thus obtained was 71.8%.

Comparative Example 1

A separable flask equipped with a thermometer, a Dimroth condenser and a stirrer was charged with 1000 g of phenol, 200 g of paraformaldehyde (92%) and 230 g of formalin (37%), and 1.0 g of hydrochloric acid was added thereto as a catalyst. The flask was dipped in an oil bath set at 130° C., and the mixture was heated and refluxed for 3 hours in a refluxing state. Further, 2.0 g of hydrochloric acid was added thereto, and the mixture was heated and refluxed for 3 hours. Next, the reaction solution was subjected in order to atmospheric distillation and vacuum distillation to obtain 882 g of a phenol resin (phenols novolac resin H). It had an ortho rate of 26% and a softening point of 98° C. A yield of the phenol resin (phenols novolac resin H) thus obtained was 69.2%.

Comparative Example 2

A separable flask equipped with a thermometer, a Dimroth condenser and a stirrer was charged with 1000 g of phenol, 200 g of paraformaldehyde (92%) and 230 g of formalin (37%), and 3.6 g of zinc acetate was added thereto as a catalyst. The flask was dipped in an oil bath set at 130° C. and heated, and the mixture was heated and refluxed for 4 hours in a refluxing state. Next, the reaction solution was subjected in order to atmospheric distillation and vacuum distillation to obtain 750 g of a phenol resin (phenols novolac resin I). It had an ortho rate of 68% and a softening point of 95° C. A yield of the phenol resin (phenols novolac resin I) thus obtained was 58.8%.

The characteristics (ortho rates, softening points and yields) of the phenols novolac resins A to I obtained in Examples 1 to 7 and Comparative Examples 1 and 2 are shown in Table 1.

An ortho rate of the phenols novolac resins was determined from optional transmissions measured by means of an infrared spectrophotometer according to the following equation:

$$\text{ortho rate (\%)} = (\log 100/T_1)/(1.44 \times \log 100/T_0 + \log 100/T_1) \times 100$$

$T_0$: 820 cm$^{-1}$ transmission (para-bonded body)
$T_1$: 760 cm$^{-1}$ transmission (ortho-bonded body)

The softening point was measured by a ring & ball method. Further, a yield of the phenols novolac resins was calculated by setting (a weight of phenols+a weight of formaldehydes+a weight of the additives) to 100%.

TABLE 1

| | | | Characteristics of phenols novolac resins | | |
|---|---|---|---|---|---|
| Items | Catalyst | Chelating agent | Ortho rate (%) | Yield (%) | Softening point (° C.) |
| Example 1 | Zinc salicylate | EDTA | 48 | 78.3 | 96 |
| Example 2 | Zinc acetate | EDTA | 49 | 70.8 | 94 |
| Example 3 | Zinc salicylate | EDTA | 55 | 78.0 | 91 |
| Example 4 | Manganese sulfate | NTA | 40 | 75.3 | 98 |
| Example 5 | Calcium carbonate | DTPA | 44 | 74.1 | 93 |
| Example 6 | Magnesium hydroxide | EDDP | 45 | 72.7 | 95 |
| Example 7 | Zinc acetate | EDTA | 59 | 71.8 | 94 |
| Comparative Example 1 | Hydrochloric acid | — | 26 | 69.2 | 98 |
| Comparative Example 2 | Zinc acetate | — | 68 | 58.8 | 95 |

EDTA: ethylenediaminetetraacetic acid
NTA: nitrilotriacetic acid
DTPA: diethylenetriamine-N,N,N',N'-pentaacetic acid
EDDP: ethylenediaminedipropionic acid Examples 8 to 14 and Comparative Examples 3 to 4

Production of Resin-Coated Sands:

A method for producing resin-coated sands by using the phenols novolac resins A to I obtained in Examples 1 to 7 and Comparative Examples 1 and 2 is shown below.

The phenols novolac resin 200 g was added to 10 kg of fluttery sands heated at 150 to 160° C. by means of Speed Marler manufactured by Enshu Tekko Co., Ltd. to coat the surfaces of the sands with the molten resin. Then, 30 g of hexamethylenetetramine and 10 g of calcium stearate were added thereto and mixed by stirring to obtain resin-coated sands.

Evaluation of Flexural Strength:

A test piece was formed by putting the resin-coated sands obtained above into a heating mold (10×10×100 mm) and heating it at 250° C. for 60 seconds. It was cooled down to room temperature (25° C.) and then subjected to a flexural test at a distance of 50 mm between supporting points and a test speed of 25 mm/minute by means of a bending test machine (3 points bending system) to measure a strength in breaking.

Evaluation of Curing Property:

A test piece was formed by putting the resin-coated sands obtained above into a heating mold (5×40×180 mm) and heating it at 250° C. for 30 seconds. The test piece taken out from the mold was put on a test table, and after 20 seconds passed, a load of 500 g was applied thereon to measure a bending value by means of a dial gauge. A distance between the supporting points was set to 150 mm. In general, the smaller the bending value is, the higher the curing property.

The characteristics (flexural strength and curing property) of the resin-coated sands obtained in Examples 8 to 14 and Comparative Examples 3 to 4 are shown in Table 2.

TABLE 2

| Items | Phenols novolac resins | Flexural strength (MPa) | Curing property (mm) |
| --- | --- | --- | --- |
| Example 8 | A | 4.45 | 2.8 |
| Example 9 | B | 4.60 | 2.5 |
| Example 10 | C | 4.10 | 2.9 |
| Example 11 | D | 4.33 | 3.2 |
| Example 12 | E | 4.30 | 2.8 |
| Example 13 | F | 4.16 | 2.7 |
| Example 14 | G | 4.10 | 2.4 |
| Comparative Example 3 | H | 3.90 | 4.4 |
| Comparative Example 4 | I | 3.50 | 5.6 |

The ortho rates of the phenol resins (phenols novolac resins H to I) obtained in Comparative Examples 1 to 2 were 26% and 68%, and the yields thereof were 69.2% and 58.8% which were less than 70%. The resin-coated sands prepared by using the phenols novolac resins H to I obtained in Comparative Examples 1 to 2 had a flexural strength of 3.9 MPa or less and a bending value of 4.4 mm or more.

In contrast with this, the ortho rates of the phenol resins (phenols novolac resins A to G) obtained in Examples 1 to 7 were 40 to 59%, and the yields thereof were 70.8% to 78.3% which were 70% or more. The resin-coated sands prepared by using the phenols novolac resins A to G obtained in Examples 1 to 7 had a flexural strength of 4.1 MPa or more and a small bending value of 3.2 mm or less, and it could be found that they had a higher curing property than in the comparative examples.

The phenols novolac resins can efficiently be produced without requiring specific production facilities, and the resin-coated sands having a high curing property can be obtained by producing the resin-coated sands by using the phenols novolac resins obtained according to the present invention. This makes it possible to shorten a production cycle in forming molds.

Further, the phenol resins (phenols novolac resins) were obtained at a suitable ortho rate and a high yield by using the metal compound as the catalyst and further using the chelating agent in order to deactivate a catalytic action of the metal compound. Accordingly, it can be found that the ortho rate can optionally be controlled by selecting addition timing of the chelating agent. In contrast with this, it can be found that in a case where the metal compound (catalyst) and the chelating agent are not used, the phenols novolac resins having a suitable ortho rate are not obtained. Further, it can be found that in a case where the chelating agent is not used, it is difficult to control the ortho rate and that a yield of the phenol resins (phenols novolac resins) is low.

INDUSTRIAL APPLICABILITY

According to the present invention, the phenols novolac resin having an ortho rate of 30 to 60%, suitably 40 to 55% can be obtained at a good yield (70% or more). The resin-coated sand prepared by using the above resin is provided with a higher curing property, and production time per cycle of molding in forming molds can be shortened.

What is claimed is:

1. A production process for a phenols novolac resin obtained by reacting phenols with formaldehydes, wherein they are reacted in the presence of a metal compound as a catalyst for the reaction described above, and a chelating agent is further added in order to deactivate a catalytic action of the metal compound, wherein the chelating agent is included in an amount of 0.01 to 20 times mole per mole of the metal compound.

2. The production process for a phenols novolac resin according to claim 1, wherein the phenols are at least one selected from phenol, cresol, xylenol, ethylphenol, phenylphenol, t-butylphenol, t-amylphenol, bisphenol A and resorcinol.

3. The production process for a phenols novolac resin according to claim 1, wherein the formaldehydes are at least one selected from formalin, paraformaldehyde and trioxane.

4. The production process for a phenols novolac resin according to claim 1, wherein the metal compound is at least one selected from oxides of monovalent to hexavalent metals, organic salts thereof, inorganic salts thereof and hydroxides thereof.

5. The production process for a phenols novolac resin according to claim 1, wherein the chelating agent is at least one selected from ethyl enediaminetetraacetic acid (EDTA), nitrilotriacetic acid (NTA), trans-1-2-cyclohexanediamine-N,N,N',N'-tetraacetic acid (CyDTA), diethylenetriamine-N,N,N',N'-pentaacetic acid (DTPA), ethylenediaminediacetic acid (EDDA), iminodiacetic acid (IDA), hydroxyethyliminodiacetic acid (HIDA), ethylenediaminedipropionic acid (EDDP), ethylenediaminetetrakismethylenephosphonic acid (EDTPO), hydroxyethylethylenediaminetetraaceetic acid (EDTA-OH), diaminopropanoltetraacetic acid (DPTA-OH), nitrilotrismethylenephosphonic acid (NTPO), bis (aminophenyl)ethyleneglycoltetraacetic acid (BAPTA), nitrilotripropionic acid (NTP), dihydroxyethylglycine (DHEG) and glycoletherdiaminetetraacetic acid (GEDTA).

6. The production process for a phenols novolac resin according to claim 1, wherein the phenols novolac resin produced has an ortho rate of 30 to 60% and a yield thereof of at least 70%.

7. The production process for a phenols novolac resin according to claim 1, wherein a use amount of the formaldehydes is 0.5 to 0.99 time mole per mole of the phenols.

8. The production process for a phenols novolac resin according to claim 1, wherein a use amount of the metal compound, in terms of a metal ion thereof, is 0.0001 to 0.1 time mole per mole of the phenols.

9. The production process for a phenols novolac resin according to claim 1, wherein initially the phenols are reacted with the formaldehydes in the presence of the metal compound, and thereafter the chelating agent is added.

10. The production process for a phenols novolac resin according to claim 9, wherein initially the phenols and formaldehydes are reacted in the presence of the metal compound for 0.1 to 8 hours, and then the chelating agent is added.

11. The production process for a phenols novolac resin according to claim 1, wherein the formaldehydes include both formalin and paraformaldehyde.

* * * * *